Patented Jan. 1, 1929.

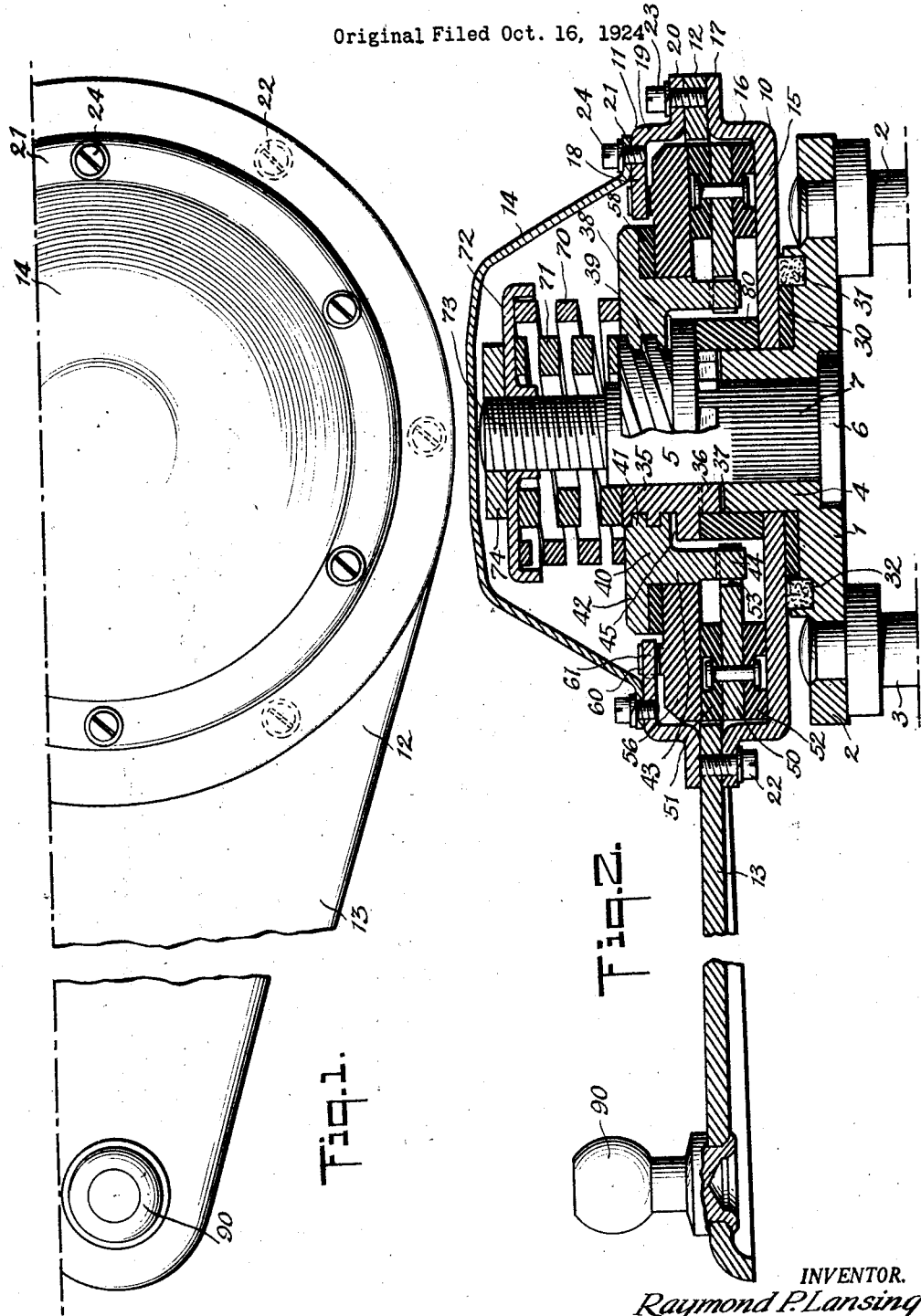

1,697,246

UNITED STATES PATENT OFFICE.

RAYMOND P. LANSING, OF MONTCLAIR, NEW JERSEY.

VEHICLE-SPRING-CONTROLLING APPLIANCE.

Application filed October 16, 1924, Serial No. 743,922. Renewed March 28, 1928.

My invention relates to appliances for controlling the action or movement of vehicle springs, or spring-connected vehicle parts such as the frame and axles.

An important object of the invention is to provide a simple, strong and durable appliance of the friction type which applies a predetermined maximum frictional resistance to the vehicle spring action in one direction of movement, this maximum resistance being applied very quickly after the beginning of the stated movement, and continuing to the end of the movement, the resistance to vehicle spring movement in the other direction usually being materially less and in some cases quite small.

Another object is to allow for moderate relative vehicle body and axle movement, as when the vehicle is traveling over approximately smooth surfaces, by providing a comparatively small frictional resistance to such movements in one or both directions within a limited range, which may be described as a substantially "free range" or period.

A further object is to avoid any, or any considerable, resistance to return movement of the vehicle axle in relation to the body, after it has moved in one direction, and especially to avoid such resistance at the beginning of the return movement; and in attaining this object, the means employed may be such that instead of offering any resistance to the initiation of the return movement, such movement may be, and preferably is, actually facilitated.

A further object is to produce the above stated effects or results in an appliance in which the friction members have an oscillating or rotative movement about an axis, and further, to produce the friction effects by the action of a spring or springs in conjunction with inclined surfaces, such a screw threads, which modify or control the spring action.

A more particular object is to provide an appliance in which the effective length or radius of one of the principal relatively-movable friction members may, when necessary or desirable, be made shorter than is usual in friction devices of this class, and to provide friction members or surfaces, pressure applying means and pressure controlling means adapted or adaptable to the use of such a short lever arm. When a short lever arm is used the friction members or surfaces may be reduced in number, or their friction values may be smaller than would otherwise be necessary, or the pressure values may be lower, while producing substantially the same retarding effect that is practicable when a longer lever arm is used with a greater number of friction members or surfaces, or higher friction or pressure values. At the same time the invention provides, as shown in the exemplifying embodiment chosen for illustration, for a sufficient plurality of main friction surfaces, which, with suitable spring-pressure values and other proper factors of design, to produce the desired checking effect in connection with either a short or a long lever arm, and without undue pressure or wear on the friction surfaces.

The provision of a structure having a short lever arm, with other suitable characteristics, as sufficiently explained above and hereafter, enables the shock absorbing appliance to be advantageously used in certain particular locations, for example, at the front end of a motor vehicle to control the action of the front vehicle spring where the axial movement is relatively small, and therefore the short lever arm provides a sufficient range of movement when connected by a link to the front axle, without danger of excessive angularity which might produce a reversal of the normal arm and link relation, sometimes referred to as a "toggle" effect. The short lever arm furthermore permits the shock absorber to be advantageously used and properly mounted at the front end of a motor vehicle employing front wheel brakes. A companion application executed on even date herewith, particularly shows and claims a representative installation of short-arm shock absorber of the present general type at the front end of a motor vehicle, in such a way as to avoid conflict with the front wheel brake drum and brake linkage, and such an installation or combination is therefore not claimed herein.

Another important object is to provide for complete enclosure of all the principal moving or wearing parts of the appliance and especially all the main friction surfaces, so as to exclude dirt and moisture and effectively retain lubricant when it is desired to use a lubricant, not only for the purpose of lubricating the moving parts and reducing wear, but to maintain a sufficient body of lubricant to act as a cushioning medium and eliminate objectionable noise which is sometimes caused by certain of the moving parts in absence of a cushioning medium. In attaining this object, provision is made for an effective seal against escape of any, or any substantial amount of lubricant at an external movable, or bearing, surface.

A further object is to provide, in improved and simplified form, an appliance of this class in which different friction surfaces have different friction values and to thus improve the action of the appliance as more fully explained hereafter.

The present invention, as represented by the exemplifying embodiment shown, is in certain respects similar to my copending applications, Ser. No. 713,532 and Ser. No. 713,533, filed May 15, 1924, and also companion applications executed on even date herewith, with important modifications and improvements, as sufficiently referred to above or explained hereafter.

The characteristics and advantages of the invention are further sufficiently explained in connection with the following detail description of the accompanying drawing, which shows an exemplifying embodiment of the invention. After considering this embodiment, skilled persons will understand that many variations may be made, and I contemplate the employment of any structures that are properly within the scope of the appended claims.

Fig. 1 is a side elevation of a vertical spring controller embodying the invention in one form.

Fig. 2 is a vertical longitudinal section of the same.

The appliance is built on or around a base plate 1 adapted to be connected or secured to one of two relatively movable and spring-connected parts of a vehicle, such as the main frame and axle. Specifically in this case, the base plate has ears 2 and is adapted for rigid connection to a side frame member by screws or studs 3. The plate has a sleeve-like extension 4, and a spindle 5 passes through this sleeve and has a head 6 located in a counterbore of the plate. There is no considerable force tending to rotate the spindle, but it may be provided with longitudinal teeth or corrugations 7, engaging similar formations in the sleeve 4.

Various parts are combined to form a structure which is rotatable in respect to the main or base plate and about the spindle. Without attaching limiting significance to the names of the parts, this rotary structure comprises in the present specific example, an inner casing member 10, an outer annular plate or casing member 11 of special form, an annular arm plate or lever hub 12 secured between members 10 and 11, and provided with a lever arm 13, and an outer cover member 14 secured to member 11.

The inner casing member includes a main flat portion 15 serving as a friction plate, a shallow cylindrical portion 16 and an annular flange 17. Casing member 11 includes an annular flat portion 18, a shallow cylindrical portion 19, and a flange 20. The cover 14 is of sheet metal pressed in dished or bell form and includes a narrow annular flange 21. The annular hub 12 of the lever arm is secured to flange 17 by screws 22 with their heads arranged inwardly, and casing member 11 is secured to the annular hub or plate 12 by screws 23 with their heads arranged outwardly. This arrangement permits the housing or casing of the rotatable structure to be opened by removing the screws 23, whereupon the casing member 11 and cover 14 may be removed without disturbing the connection between hub 12 and the inner housing member 10. The cover 14 may also be removed by removing the screws 24 which secure its flange 21 to housing member 11, to give access to the springs and other parts later referred to, without disconnecting the outer casing member 11.

The central portion of the inner face 15 of housing member 10 constitutes a friction or bearing surface confronting the outer face of plate 1, and preferably a flat annular disc 30 is interposed between these surfaces to form the actual bearing contact. In some cases, this disc may be of a suitable material, such as hard fibre which has a substantial, though small, friction coefficient. Otherwise it may be of a metal, such as bronze, which has a still smaller friction coefficient when in contact with steel, of which housing member 10 is usually made. A compressible washer 31 of felt or other suitable material is arranged about the periphery of disc 30 in contact with the inner face of housing member 10, and is located in an annular recess 32 formed in plate 1. This washer excludes dirt and water from the contacting surfaces of plate 15 and disc 30, and also serves to largely or entirely prevent an escape of lubricant between these surfaces.

The central aperture of plate 15 has a bearing fit about sleeve 4. A member 35 sometimes referred to as a shifter, or otherwise as a nut, is arranged for endwise movement on spindle 5. The inward end of this shifter is provided with jaws 36 interfitting with jaws 37 formed on the outer end of sleeve 4, to prevent rotation of the shifter. The nut has a flange 38 and outwardly from the flange is provided with screw threads 39 having a fairly steep pitch angle which may in a particular instance be approximately 30 degrees, although this angle may be varied in accordance with other factors of design such as spring pressure, desired friction effect, etc.

A friction member 40 is provided with internal threads 31 co-operating with screw threads 39. This member, which is sometimes identified as a "pressure member", has a flange 42 constituting an annular friction plate, and it also has a cylindrical inward extension 43 terminating in jaws 44. A moderate but definite clearance as at 45 is provided between the inward face of member 40 inside of the cylindrical extension 43, and the outer face of nut flange 38.

An annular friction plate or ring 50 is provided with flat annular friction discs 51 and 52, which may be secured to the plate by rivets. These friction rings are of any suitable material, such as asbestos or asbestos composition or fabric of the type frequently employed for clutch and brake facings. Friction ring 52 bears against an inner surface of plate 15, which constitutes a friction surface in co-operation with the ring.

Plate 50 is centrally apertured and in the aperture are formed jaws 53, interfitting with jaws 44 to prevent relative rotation of plate 50 and friction member 40, and permit relative slight axial movement.

An annular friction plate 56 has its central aperture arranged with a bearing fit about the cylindrical extension 43 of member 40. Its inward face is in contact with friction ring 51. A portion of its outer face confronts the inner face of flange 42 and an annular friction disc or ring 58 is interposed between these faces. This ring may be of material similar to the rings or discs 51 and 52. On the outer face of plate 56 are lugs or jaws 60 interfitting with jaws 61 formed in the flat annular portion 18 of housing member 11. These co-operating jaws prevent relative rotation of plate 56 and member 11, and in fact compel plate 56 always to move in accordance with the rotative movement of the entire rotary structure, while permitting slight axial movement of plate 56.

Yieldable means are provided to urge the various friction surfaces into frictional contact. Most conveniently, such means consist of one or more springs, and specifically in the present example, two compression springs 70 and 71, are provided for this purpose. These springs are arranged one within the other, with their outer ends bearing against an abutment, which consists of a nut 72 screwed on a threaded extension 73 of the spindle, and secured in adjusted position by a lock nut 74. The outer spring 70 is desirably of smaller cross-section or is otherwise designed to provide a smaller pressure effect than spring 71, which is relatively "heavy" or of greater cross-section to provide a very substantial pressure value. The inward end of spring 70 bears against the outer face of friction member 40, and the inward end of spring 71 bears against the outer end of the shifter or nut 35.

While in some cases the nut or shifter may seat against the outer end of sleeve 4, preferably, for reasons sufficiently explained hereafter, it does not seat in this fashion, but a cylindrical spacer 80 is interposed between nut flange 38 and an inner surface of the plate portion 15 of the inner housing member 10, so that the nut through its flange 38, seats on the spacer and the pressure of spring 71 is at all times effective through the nut, the nut flange, spacer 80 and plate 15 to urge the whole rotary structure inward in relation to the base plate 1, and especially to maintain the inward friction surface of plate 15 in firm contact with bearing ring 30, and so to maintain a tight oil seal at this point.

Lever arm 13 is provided with any suitable means, such as the ball-end fitting 90, for connection by a suitable link to a part of the vehicle such as the axle; and the arm is shown broken away to graphically represent the fact that it may be made of any suitable length. Sometimes the arm may be made very short, say only about one-half the length of the lever arm usually employed in shock absorbers of known types, and in that case, the described structure includes a sufficient number of friction surfaces to provide the necessary retardation; and the complete appliance with such a short arm is well adapted for service in such locations as the front end of a motor vehicle, where the total axle movement is relatively small, usually only about 4" or 4½", and the short arm therefore provides for this movement without an overthrow, or locking effect between the arm and link, sometimes referred to as a "toggle action". Such a short-arm shock absorber is also well adapted for application to the front end of vehicles having front wheel brakes, and may then be connected in such a way that it will not interfere with the brake drum or operating linkage, as sufficiently shown in a companion application, executed on even date herewith, and in which claims are made for such an arrangement, installation or combination.

Otherwise, the lever arm 13 may be of any ordinary or suitable length, and with proper spring value and pitch angles of the screw thread, sufficient friction surfaces are provided to provide the necessary frictional retardation with an arm of such length.

The appliance may be arranged to oppose the greatest resistance to either vehicle spring compression or recoil. It is, however, usually considered advisable to oppose the greatest resistance to spring recoil, and the following operative description is made with the understanding that the appliance is arranged for that purpose. The operation of the appliance when arranged to oppose the greatest resistance to vehicle spring compression, can be readily understood by reading the operative description with suitable changes in words which refer to positions of parts or directions of movement.

Assuming that the screw threads on the shifter and friction member 40 have a right hand lead, when the vehicle road wheel strikes a bump which causes vehicle spring compression, the rotary structure comprising the lever arm with its hub 12, housing members 10 and 11, and certain of the enclosed members, rotate counter-clockwise about the spindle, or, as viewed in Fig. 2, the ball end of the lever moves toward the eye of the observer. Plate 56 moves at the same time by the positive connection provided by lugs 60 and 61. Friction member 40 and plate 50 also move with the rest of the rotary structure in the first part of the stated movement by friction between plate 56 and ring 58, between plate 56 and friction ring 51, and by frictional contact of ring 52 with plate 15; and friction member 40 and plate 50 are moreover positively connected by lugs 44 and 53, so that they always move together. During the first small part of the stated movement and until screw-thread clearance is taken up, therefore, there is no friction resistance except the slight or sometimes negligible amount afforded by plate 15 moving against the outer face of ring 30. Since this area of contact is usually, as shown, of small average radius, and since the material of ring 30 may be a hard fibre or metal, which has a very small friction coefficient, and moreover, this surface is lubricated by a small amount of lubricant creeping along the outer surface of sleeve 4, this friction resistance may in some cases be considered negligible. This is, moreover, constant, since contact at this point is always firmly maintained by the combined pressures of the two springs 70 and 71. As soon as thread clearance is taken up, in the continuance of the stated movement, friction member 40 rotates in relation to the irrevoluble shifter 35 and by the action of the screw threads is "lifted" or moved slightly outward against the pressure of spring 71, this pressure being proportionately reduced, and slippage thereupon occurs between flange 42 or its friction ring and the outer face of plate 56, and also between plate 56 and plate 50, and between plate 15 and plate 50 or the interposed friction rings. This frictional resistance on three surfaces of substantial average radius, and relatively high friction coefficient, but with reduced pressure due to the outward thrust of the pressure member 40, is effective to the end of the vehicle spring compression movement, after being once produced after a very short initial part of the travel, in the manner above described. While this resistance is of a substantial value, it is usually made, by proper design of spring 70, of quite a moderate value, so that the maximum resistance to vehicle spring compression is not large, and especially is much less than that opposed to spring recoil.

At the end of the stated vehicle axle movement, the vehicle spring recoil will almost invariably immediately follow. In the first small part of this movement practically no friction resistance is provided by the shock absorber, since friction members 40 and 50 move along with the housing by their frictional engagement. This movement is, moreover, in most specific designs of the appliance, actually facilitated by the pressure of spring 70, which tends to run the friction member 40 on the nut threads, and therefore tends to cause rotation of the lever arm and entire rotary structure. As soon as thread clearance is taken up, a very definite and material resistance is provided to the arm movement, because at this instant, although the various friction members continue to rotate by frictional contact with the entire rotary structure, the rotation of member 40 through the screw threads commences to "lift" the shifter or nut 35, and resistance is provided by the work required to additionally compress spring 71. This part of the movement constitutes what may be conveniently called a "windup period" and continues without added friction effect until the clearance at 45 is taken up, or in other words, until nut flange 38 encounters the adjacent face of member 40, whereupon member 40 and plate 50 positively connected with it, are locked against further rotation and frictional slippage occurs between member 40 and plate 56, and between plate 50 and plates 56 and 15, with the full friction value due to the combined pressures of springs 70 and 71, the latter being now fully compressed and exerting its full pressure value.

This maximum frictional resistance of which the appliance is capable, is by suitable factors of design adequate to properly check the vehicle spring recoil, and is maintained to the end of the recoil stroke without variation, except that due to the changing angularity of the lever arm, which may be disregarded for purposes of the present invention. After the stated vehicle spring recoil movement, or whenever another vehicle spring compression movement occurs, while nut 35 is lifted from its seat against the spacer 80, any locking action due to the screw threads is prevented by the fact that the pitch angle of these threads is sufficiently steep to prevent such a locking action and in fact the angle is such that rotation of the friction member 40 on the screw threads is actually facilitated by the effect of spring 70.

It is evident from the foregoing that a small but appreciable angle of relatively free movement is provided in either direction, corresponding to the normal "jiggle" of the vehicle spring while running over relatively smooth road surfaces, this effect being proportionate practically to the normal screw thread clearance. An additional small angle or period of movement with relatively small frictional effect is furthermore provided in the vehicle spring recoil movement, this corresponding to the windup period above referred to, or the angle of movement during which the clearance at 45 is being taken up and before slippage occurs at the main friction surfaces.

While the nut or shifter 35 is lifted away from the outer face of spacer 80 during any considerable vehicle spring recoil movement, the full force of this spring is nevertheless always effective to retain plate 15 in contact with the bearing surface of ring 30, because, as soon as the shifter leaves contact with the spacer, the pressure of spring 71 is transferred through the shifter to friction member 40 and from it to plate 56, to plate 50 and so to plate 15 and the inner housing member, and as above stated, spring 70 also acts constantly to maintain contact at the stated surface. The appliance may therefore be effectively lubricated by a suitable quantity of heavy oil or grease which is retained by the tight enclosure provided by the casing members 10 and 11, and cover 14, the only external moving joint being at the bearing surface of disc 30; and any considerable or appreciable leakage of lubricant at that surface is prevented by the close pressure contact of plate 15 due to the spring effect. Provision of this or equivalent means for properly retaining lubricant is important, not only for the purpose of reducing wear of moving parts, such as the screw threads and friction surfaces, but more especially because a substantial body of lubricant of suitable thickness or viscosity provides a cushion between relatively moving parts, such as nut flange 38 and the outer surface of spacer 80, and prevents any bumping or rattling noises which would be occasioned by the forcible contact of these parts or surfaces in the absence of lubricant, or other suitable cushioning means, as the shifter moves back and forth.

A sufficient number of main bearing surfaces is provided to insure an adequate friction value in the presence of lubrication, and moreover, by providing a substantial plurality of such main friction surfaces, with proper spring pressure and screw thread angle, the unit pressure on each surface may be kept sufficiently low to avoid cutting or undue wear, and the appliance will run for many thousands of miles in ordinary vehicle surface without replacement of friction rings and even without adjustment.

Lubricant may be renewed from time to time as necessary by removing the cover 14, or a suitable filler nipple may be provided in the cover for this purpose.

I claim:—

1. A vehicle spring controller comprising a structure adapted to be connected to one of two vehicle parts such as the frame and axle, another relatively revoluble structure adapted for connection to the other of said vehicle parts, a first friction member connected to rotate with said revoluble structure, a second relatively revoluble friction member frictionally engaged between the first friction member and a part of the revoluble structure, an intermediate member having frictional co-operation with the first friction member and connected irrevolubly to the second friction member, and yieldable pressure means and an inclined element co-operating with the intermediate member.

2. A vehicle spring controller comprising a structure adapted to be connected to one of two vehicle parts such as the frame and axle, another relatively revoluble structure adapted for connection to the other of said vehicle parts, a first friction member connected to rotate with said revoluble structure, a second relatively revoluble friction member frictionally engaged between the first friction member and a part of the revoluble structure, an intermediate member having frictional co-operation with the first friction member and connected irrevolubly to the second friction member, and means comprising a yieldable device and an inclined element for producing pressure on the friction surfaces and varying the pressure effect in different directions of movement of the revoluble structure in relation to the structure first named.

3. A vehicle spring controller comprising a structure adapted to be connected to one of two vehicle parts such as the frame and axle, another relatively revoluble structure having a lever arm adapted for connection to the other of said vehicle parts, a first friction plate connected to rotate with said revoluble structure and arranged for axial movement, a second relatively revoluble friction plate frictionally engaged between the first plate and a part of the revoluble structure, a pressure member having friction co-operation with the first plate and connected irrevolubly to the second plate, and yieldable pressure means and an inclined element co-operating with the pressure member.

4. A vehicle spring controller comprising a structure adapted to be connected to one of two vehicle parts such as the frame and axle, another relatively revoluble structure having a lever arm adapted for connection to the other of said vehicle parts, a first friction plate connected to rotate with said revoluble structure and arranged for moderate axial movement, a second relatively revoluble friction plate frictionally engaged between the first plate and a part of the revoluble structure, a pressure member having frictional co-operation with the first plate and connected irrevolubly to the second plate, and means comprising a spring and an inclined element for producing pressure on the friction surfaces and varying the pressure effect in different directions of movement of the revoluble structure in relation to the structure first named.

5. A vehicle spring controller comprising a structure adapted to be connected to one of two vehicle parts such as the frame and axle, another relatively revoluble structure adapted for connection to the other of said vehicle parts, a first friction member connected to rotate with said revoluble structure, a second relatively revoluble friction member frictionally engaged between the first friction member and a part of the revoluble structure, an intermediate member having frictional cooperation with the first friction member and connected irrevolubly to the second friction member, an inclined element co-operating with said intermediate member, and yieldable pressure means co-operating with said member, said inclined element and pressure means co-operating to produce different pressure effects on the friction surfaces in different directions of movement of the revoluble structure in relation to the structure first named.

6. A vehicle spring controller comprising a structure adapted to be connected to one of two vehicle parts such as the frame and axle, another relatively revoluble structure adapted for connection to the other of said vehicle parts, a first friction member connected to rotate with said revoluble structure, a second relatively revoluble friction member frictionally engaged between the first friction member and a part of the revoluble structure, an intermediate member having frictional cooperation with the first friction member and connected irrevolubly to the second friction member, a spring for producing friction pressure, and means including an inclined element cooperating with the intermediate member and spring to vary the pressure effect.

7. A vehicle spring controller comprising a structure adapted to be connected to one of two vehicle parts such as the frame and axle, another relatively revoluble structure adapted for connection to the other of said vehicle parts, a first friction member connected to rotate with said revoluble structure, a second relatively revoluble friction member frictionally engaged between the first friction member and a part of the revoluble structure, an intermediate member having frictional co-operation with the first friction member and connected irrevolubly to the second friction member, a spring, an axially shiftable member co-operating with the spring, and inclined members connecting the shiftable member and the intermediate member.

8. A vehicle spring controller comprising a member adapted to be connected to a vehicle part such as the frame, a spindle extending therefrom, a revoluble structure mounted for rotation about the spindle and having a lever arm adapted to be connected to another vehicle part such as the axle, a first friction plate connected irrevolubly to the revoluble structure, a second friction plate rotatable in respect to the revoluble structure and frictionally held between the first plate and a part of said structure, a pressure member having frictional engagement with said first friction plate and irrevolubly connected to said second plate, a shifter arranged for axial movement and secured against rotation, inclined members connecting the shifter and pressure member, and yieldable means co-operating with the pressure member to produce friction pressure.

9. A vehicle spring controller comprising a member adapted to be connected to a vehicle part such as the frame, a spindle extending therefrom, a revoluble structure mounted for rotation about the spindle and having a lever arm adapted to be connected to another vehicle part such as the axle, a first friction plate connected irrevolubly to the revoluble structure, a second friction plate rotatable in respect to the revoluble structure and frictionally held between the first plate and a part of said structure, a pressure member having frictional engagement with said first friction plate and irrevolubly connected to said second plate, a shifter arranged for axial movement and secured against rotation, inclined members connecting the shifter and pressure member, and yieldable means co-operating with the shifter to produce friction pressure.

10. A vehicle spring controller comprising a member adapted to be connected to a vehicle part such as the frame, a spindle extending therefrom, a revoluble structure mounted for rotation about the spindle and having a lever arm adapted to be connected to another vehicle part such as the axle, a first friction plate connected irrevolubly to the revoluble structure, a second friction plate rotatable in respect to the revoluble structure and frictionally held between the first plate and a part of said structure, a pressure member having frictional engagement with said first friction plate and irrevolubly connected to said second plate, a shifter arranged for axial movement and secured against rotation, inclined members connecting the shifter and pressure member, yieldable means co-operating with the pressure member to produce friction pressure, and yieldable pressure means cooperating with the shifter to produce friction pressure.

11. A vehicle spring controller comprising a member adapted to be connected to a vehicle part such as the frame, a spindle extending therefrom, a revoluble structure mounted for rotation about the spindle and having a lever arm adapted to be connected to another vehicle part such as the axle, the revoluble structure and the member first named having co-operating thrust-bearing surfaces which have a small friction value, a first friction plate connected irrevolubly to the revoluble structure, a second friction plate rotatable in respect to the revoluble structure, a pressure member having frictional engagement with said first friction plate and irrevolubly connected to said second plate, a shifter arranged for axial movement and secured against rotation, inclined members connecting the shifter and pressure member, and yieldable means co-operating with the pressure member to produce friction pressure.

12. A vehicle spring controller comprising a member adapted to be connected to a vehicle part such as the frame, a spindle extending therefrom, a revoluble structure mounted for rotation about the spindle and having a lever arm adapted to be connected to another vehicle part such as the axle, the revoluble structure and member first named having co-operating thrust-bearing surfaces which have a small friction value, a first friction plate connected irrevolubly to the revoluble structure, a second friction plate rotatable in respect to the revoluble structure and frictionally held between the first plate and a part of said structure, a pressure member having frictional engagement with said first friction plate and irrevolubly connected to said second plate, a shifter arranged for axial movement and secured against rotation, inclined members connecting the shifter and pressure member, and yieldable means co-operating with the pressure member to produce friction pressure, said yieldable means also serving to maintain contact at said bearing surface.

13. A vehicle spring controller comprising a member adapted to be connected to a vehicle part such as the frame, a spindle extending therefrom, a revoluble structure mounted for rotation about the spindle and having a lever arm adapted to be connected to another vehicle part such as the axle, a first friction plate connected irrevolubly to the revoluble structure, a second friction plate rotatable in respect to the revoluble structure and frictionally held between the first plate and a part of said structure, a pressure member having frictional engagement with said first friction plate and irrevolubly connected to said second plate, and a shifter arranged for axial movement and secured against rotation, the shifter and pressure member being arranged to lock the pressure member against rotation after limited rotary movement in one direction.

14. A vehicle spring controller comprising a member adapted to be connected to a vehicle part such as the frame, a spindle extending therefrom, a revoluble structure mounted for rotation about the spindle and having a lever arm adapted to be connected to another vehicle part such as the axle, a first friction plate connected irrevolubly to the revoluble structure, a second friction plate rotatable in respect to the revoluble structure and frictionally held between the first plate and a part of said structure, a pressure member having frictional engagement with said first friction plate and irrevolubly connected to said second plate, and a shifter arranged for axial movement and secured against rotation, the shifter having a flange co-operating with the pressure member with substantial clearance to lock the pressure member after limited rotation in one direction, inclined members connecting the shifter and pressure member, and yieldable means co-operating with the pressure member to produce friction pressure.

15. A vehicle spring controller comprising a member adapted to be connected to a vehicle part such as the frame, a spindle extending therefrom, a revoluble structure mounted for rotation about the spindle and having a lever arm adapted to be connected to another vehicle part such as the axle, a first friction plate connected irrevolubly to the revoluble structure, a second friction plate rotatable in respect to the revoluble structure and frictionally held between the first plate and a part of said structure, a pressure member having frictional engagement with said first friction plate and irrevolubly connected to said second plate, a shifter arranged for axial movement and secured against rotation, a spacer co-operating with the shifter to limit movement of the latter in one direction and transfer pressure through the shifter to the revoluble structure, inclined members connecting the shifter and pressure member, and yieldable means co-operating with the pressure member to produce friction pressure.

16. A vehicle spring controller comprising a base plate adapted to be connected to a vehicle part such as the frame, a spindle extending therefrom, a revoluble structure mounted for rotation about the spindle and having a lever arm adapted to be connected to another vehicle part such as the axle, the revoluble structure and the base plate having co-operation thrust bearing surfaces of small friction value, a first friction plate connected irrevolubly to the revoluble structure, a second friction plate rotatable in respect to the revoluble structure and frictionally held between the first friction plate and a part of said structure, a pressure member having frictional engagement with said first friction plate and irrevolubly connected to said second plate, a shifter arranged for axial movement and secured against rotation, screw threads connecting the shifter or pressure member, yieldable means co-operating with the pressure member and shifter to produce friction pressure, and a spacer co-operating with the shifter to limit movement of the latter in one direction and transfer pressure of the yieldable means to the revoluble structure and maintain contact at the thrust bearing surfaces.

17. A vehicle spring controller comprising a base having a thrust bearing surface and a rotary structure thereon having a part in contact with said bearing surface, said rotary structure including an inner casing member, a lever-arm extending therefrom, an outer casing member and a cover, a first friction plate having an irrevoluble connection with the outer casing member, a pressure member having frictional engagement with the first friction plate, a second friction plate frictionally held between the first friction plate and a friction surface of the inner casing member, the pressure member and second friction plate having an irrevoluble connection, and means comprising a spring and an inclined element for applying friction pressure to the friction surfaces in co-operation with the pressure member.

18. A vehicle spring controller comprising a base having a thrust bearing surface and a rotary structure thereon having a part in contact with said bearing surface, said rotary structure including an inner casing member, a lever-arm extending therefrom, an outer casing member and a cover, a first friction plate having jaws co-operating with jaws on the outer casing member, a pressure member having frictional engagement with the first friction plate, a second friction plate frictionally held between the first friction plate and a friction surface of the inner casing member, the pressure member and second friction plate having interfitting jaws, and means comprising a spring and an inclined element for applying friction pressure to the friction surfaces in co-operation with the pressure member.

19. A vehicle spring controller comprising a base plate adapted to be secured to a vehicle frame member, a spindle extending from the base plate, the plate having a thrust bearing surface surrounding the spindle, said surface having a low friction value, a rotary structure including an inner casing member revoluble about the spindle axis and having a surface engaging the base plate bearing surface, a lever arm, an outer casing member and a cover forming a tight closure for the rotary structure, a shifter movable axially on the spindle and having means co-operating with the base plate to prevent shifter rotation, a pressure member in screw threaded engagement with the shifter, the pressure member and shifter having co-operating means to limit rotary movement of the pressure member in one direction, a first friction plate non-rotatably engaging the outer casing member and having a surface in frictional engagement with a portion of the pressure member, a second friction plate located between the first friction plate and said inner casing member and in frictional engagement with them, the pressure member and second friction plate having non-rotatable connection, a spring abutment on the spindle, and spring means for applying friction pressure in co-operation with the shifter and pressure member.

20. A vehicle spring controller comprising a base plate adapted to be secured to a vehicle frame member, a spindle extending from the base plate, the plate having a thrust bearing surface surrounding the spindle, said surface being of small average radius and having a low friction coefficient, a rotary structure including an inner dished casing member revoluble about the spindle axis and having a surface engaging the base plate bearing surface, a lever arm having an annular portion secured to a part of said casing member, an outer casing member secured to the annular lever portion and having jaws at its inner periphery and a cover secured to the outer casing member and forming a tight closure for the rotary structure, a shifter movable axially on the spindle and having means co-operating with the base plate to prevent shifter rotation, a spacer between the shifter and said inner casing member to transfer shifter thrust in some cases to said casing member through the spacer, a pressure member in screw-threaded engagement with the shifter, the pressure member and shifter having co-operating means to limit rotary movement of the pressure member in one direction, a first friction plate having a surface in friction engagement with a portion of the pressure member, a second friction plate located between the first friction plate and said inner casing member and in frictional engagement with them, the pressure member and second friction plate having co-operating jaws, a spring abutment adjustably secured on the outward end of the spindle and means acting between the abutment and the pressure member and shifter.

Signed at Hoboken in the county of Hudson and State of New Jersey this third day of October, A. D. 1924.

RAYMOND P. LANSING.